(12) United States Patent
Yamawaku et al.

(10) Patent No.: US 8,052,376 B2
(45) Date of Patent: Nov. 8, 2011

(54) TURBO-MOLECULAR PUMP, SUBSTRATE PROCESSING APPARATUS, AND METHOD FOR SUPPRESSING ATTACHMENT OF DEPOSITIONS TO TURBO-MOLECULAR PUMP

(75) Inventors: Jun Yamawaku, Nirasaki (JP); Tsuyoshi Moriya, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 825 days.

(21) Appl. No.: 12/057,767

(22) Filed: Mar. 28, 2008

(65) Prior Publication Data

US 2008/0240910 A1  Oct. 2, 2008

Related U.S. Application Data

(60) Provisional application No. 60/947,534, filed on Jul. 2, 2007.

(30) Foreign Application Priority Data

Mar. 29, 2007  (JP) .................................. 2007-089805

(51) Int. Cl.
  *F04D 17/06*  (2006.01)
(52) U.S. Cl. .......................... 415/90; 415/117
(58) Field of Classification Search ...... 415/90
  See application file for complete search history.

(56) References Cited

U.S. PATENT DOCUMENTS

| 5,879,139 A * | 3/1999 | Hayashi et al. ................. 415/90 |
| 6,030,189 A * | 2/2000 | Bohm et al. ..................... 415/90 |
| 6,224,326 B1 * | 5/2001 | Puech ............................. 415/90 |

FOREIGN PATENT DOCUMENTS

| JP | 61043297 A | * | 3/1986 |
| JP | 05231369 A | * | 9/1993 |
| JP | 9-32794 | | 2/1997 |
| JP | 11-311198 | | 11/1999 |
| KR | 1999-023589 | | 3/1999 |

OTHER PUBLICATIONS

JP 05231369 A Machine Translation. Accessed JPO website Mar. 21, 2011.*

* cited by examiner

*Primary Examiner* — Richard Edgar
(74) *Attorney, Agent, or Firm* — Oblon, Spivak, McClelland, Maier & Neustadt, L.L.P.

(57) ABSTRACT

A turbo-molecular pump that enables reliable suppression of attachment of depositions onto component parts thereof. The turbo-molecular pump discharges a deposition-causing gas from a processing chamber. A rotor has a rotor shaft aligned with an exhaust stream. A cylindrical casing houses the rotor therein. A plurality of blade-form rotor blades projects from the rotor orthogonally with respect to the rotor shaft and are divided into a plurality of rotor blade groups. A plurality of blade-form stator blades projects orthogonally with respect to the rotor shaft from a rotor-facing surface and are divided into a plurality of stator blade groups. Gas supply ports are located on an upstream side of the rotor blade group that is located furthest downstream in the exhaust stream, and supply a deposition-suppressing gas which includes gas molecules having a large molecular weight.

18 Claims, 8 Drawing Sheets

TURBO-MOLECULAR PUMP, SUBSTRATE PROCESSING APPARATUS, AND METHOD FOR SUPPRESSING ATTACHMENT OF DEPOSITIONS TO TURBO-MOLECULAR PUMP

BACKGROUND OF THE INVENTION

1. Field of the Invention

This invention relates to a turbo-molecular pump, a substrate processing apparatus, and a method for suppressing attachment of depositions to the turbo-molecular pump, and in particular to a turbo-molecular pump for discharging a deposition-causing gas.

2. Description of the Related Art

Generally, substrate processing apparatus for performing plasma processing on wafers for semiconductor devices is equipped with a processing chamber (hereinafter referred to as "chamber") for performing a predetermined processing on substrates housed therein. When the plasma processing in the substrate processing apparatus is etching processing, CF gas or like is introduced into the chamber as a processing gas, and the plasma generated from the CF gas is used in the etching processing. During the etching processing, the plasma reacts with an etching film of the wafers, but a certain amount of unreacted processing gas is left over. Also, reaction products are sometimes generated by the reaction between the plasma and the etching film, and the generated reaction products may vaporize and mix with the unreacted processing gas.

After the etching processing, the unreacted processing gas alone or the mix of the unreacted processing gas and the vaporized reaction product (hereinafter both referred to as "deposition-causing gas") is discharged from the chamber using a turbo-molecular pump connected to the chamber.

FIG. 8 is cross-sectional view schematically showing a construction of the conventional turbo-molecular pump. Note that in FIG. 8 the exhaust gas from the chamber is flowing from an upper part to a lower part.

In FIG. 8, a turbo-molecular pump 80 includes a rotor 81 which is a rotating body having a rotor shaft extending in a direction of flow of the exhaust gas and a cylindrical case 82 which houses the rotor 81. A plurality of blade-form rotor blades 83 project orthogonally from the rotor 81 with respect to the rotor shaft. A plurality of blade-form stator blades 84 project orthogonally with respect to the rotor shaft from an internal wall of the case 82 towards the rotor 81. The rotor blades 83 and the stator blades 84 form a turbine. When the rotor 81 is rotated at high speed by an induction motor, the turbo-molecular pump 80 drives gas that is upstream of the turbine to a downstream side of the turbine at high speed. The gas driven to the downstream side of the turbine is discharged to an external portion via an exhaust pipe 85.

Note that gas is continuously fed by the turbine into a space LS (herein after referred to as a "lower space") between the turbine and the exhaust pipe 85 in the turbo-molecular pump 80. Also, since a volume of the exhaust pipe 85 is smaller than a volume of the lower space LS, gas fed into the lower space LS by the turbine builds up in the lower space LS. As a consequence, the pressure rises in the lower space LS. Here, the gas discharged by the turbo-molecular pump 80 is a deposition-causing gas. Thus, if the pressure in the lower space LS exceeds the saturated vapor pressure of the processing gas or the like in the deposition-causing gas, components of the processing gas liquefy and the reaction product solidifies, causing attachment of depositions to surfaces of the rotor 81 or the like which face the lower space LS. Since the depositions lower the discharge efficiency of the turbo-molecular pump 80, and in a worst-case scenario, causes the turbo-molecular pump 80 to seize, there is a need to suppress the depositions.

In the prior art, a turbo-molecular pump including a heating apparatus which generates eddy currents using the rotation in the turbo-molecular pump has been developed as a turbo-molecular pump for suppressing attachment of depositions. In this turbo-molecular pump, the Joule heat caused by the generated eddy currents is transmitted to the various component parts thereof (see Japanese Laid-Open Patent Publication (Kokai) No. H9-32794, for instance). In such turbo-molecular pumps, the temperature of the component parts is raised to vaporize reaction products or processing gas which have reached the surface of the component parts, thereby suppressing attachment of the depositions.

However, the following problems occur when raising the temperature of the component parts by transmitting heat from the heating apparatus.

1. Since heat is applied to all the component parts, the degree of thermal expansion of the component parts increases. Such thermal expansion may damage the component parts.
2. The depositions temporarily attaching to the component parts forms an insulating layer, and it is not therefore possible to raise the temperature at the surface of the depositions. As a result, new depositions attaching to the surface of the depositions cannot be suppressed.
3. Since it is not possible to raise the temperature of component parts not mechanically connected to the heating apparatus, attachment of depositions cannot be suppressed in all of the component parts.

In other words, attachment of depositions to the component parts cannot be reliably suppressed by transmission of heat from the heating apparatus.

Also, since the rate of attachment of depositions varies depending on the processing gas, it is difficult, when attachment of the depositions to the component parts cannot be reliably suppressed, to set a timing at which the turbo-molecular pump are to be replaced. Hence, stable running of the turbo-molecular pump and, by extension, the substrate processing apparatus cannot be ensured.

SUMMARY OF THE INVENTION

The present invention provides a turbo-molecular pump, a substrate processing apparatus, and method for suppressing attachment of depositions to a turbo-molecular pump, which enable reliable suppression of attachment of depositions onto component parts.

Accordingly, in a first aspect of the present invention, there is provided a turbo-molecular pump configured to discharge a deposition-causing gas from a processing chamber for performing processing on a substrate, the turbo-molecular pump comprising a rotor having a rotor shaft aligned with an exhaust stream, a cylindrical casing housing the rotor therein, a plurality of blade-form rotor blades projecting from the rotor orthogonally with respect to the rotor shaft, the plurality of rotor blades being divided into a plurality of rotor blade groups, a plurality of blade-form stator blades projecting orthogonally with respect to the rotor shaft from a rotor-facing surface in the cylindrical casing, the plurality of stator blades being divided into a plurality of stator blade groups, and a gas supply port located on an upstream side of the rotor blade group that is located furthest downstream in the exhaust stream, wherein the rotor blade groups and the stator blade groups are disposed alternately along the rotor shaft, and the gas supply port supplies a deposition-suppressing gas which includes gas molecules having a large molecular weight.

According to a first aspect of the present invention, the gas supply port located on the upstream side of the rotor blade group located furthest downstream in the exhaust stream supplies the deposition-suppressing gas including the gas molecules having the large molecular weight. The gas molecules having the large molecular weight in the supplied deposition-suppressing gas join with the exhaust stream and make contact with the rotor blades. Because the rotor blades are rotating at high speed, frictional heat is generated when the rotor blades make contact with the molecules having the large molecular weight, and the deposition-suppressing gas is heated by the frictional heat. The heated deposition-suppressing gas makes contact with all the component parts facing into the space on the downstream side of the rotor blade groups, and all of these component parts are therefore heated. As a result, it is possible to suppress attachment of depositions to all the component parts facing into the above-described space. Also, since the heated deposition-suppressing gas makes contact with the surfaces of the component parts, only the surfaces of the component parts are heated. Hence, it is possible to suppress the thermal expansion in the component parts, and thereby prevent damage to the component parts. Moreover, when depositions have attached to the surface of the component parts, the heated deposition-suppressing gas makes contact with the attached depositions. Hence, it is possible to heat the depositions directly and remove the depositions by vaporization. According to the above, it is possible to reliably suppress attachment of the depositions onto the component parts. Hence, the timing at which to replace the turbo-molecular pump can be set in a simple manner and it is possible to ensure the stable running of the turbo-molecular pump, and, by extension, the substrate processing apparatus.

The first aspect of the present invention can provide a turbo-molecular pump, wherein the molecular weight is at least an atomic weight of argon.

According to the first aspect of the present invention, since the molecular weight of the gas molecules included in the deposition-suppressing gas is at least the atomic weight of argon, it is possible to increase the frictional heat generated when the gas molecules make contact with the rotor blades, and thus, to reliably heat the deposition-suppressing gas.

The first aspect of the present invention can provide a turbo-molecular pump, wherein the deposition-suppressing gas has been heated to high-temperature.

According to the first aspect of the present invention, since the deposition-suppressing gas has been heated to a high temperature, the temperature of the deposition-suppressing gas can be raised more reliably than in the case in which the heating by frictional heat resulting from contact between the rotor blades and the gas molecules is used alone. As a result, the temperature of the surfaces of the component parts which make contact with the deposition-suppressing gas can be raised reliably.

The first aspect of the present invention can provide a turbo-molecular pump, wherein the gas supply port supplies a cleaning gas in addition to the deposition-suppressing gas.

According to the first aspect of the present invention, the gas supply port supplies a cleaning gas in addition to the deposition-suppressing gas, and it is therefore possible to reliably remove any depositions that have attached to the surfaces of the component parts.

The first aspect of the present invention can provide a turbo-molecular pump, wherein the cleaning gas includes at least one of a group made up of ozone, ammonia, and chlorine trifluoride.

Accordingly, in a second aspect of the present invention, there is provided a turbo-molecular pump configured to discharge a deposition-causing gas from a processing chamber for performing processing on a substrate, the turbo-molecular pump comprising a rotor having a rotor shaft aligned with an exhaust stream, a cylindrical casing housing the rotor therein, a plurality of blade-form rotor blades projecting from the rotor orthogonally with respect to the rotor shaft, the plurality of rotor blades being divided into a plurality of rotor blade groups, and a plurality of blade-form stator blades projecting orthogonally with respect to the rotor shaft from a rotor-facing surface in the cylindrical casing, the plurality of stator blades being divided into a plurality of stator blade groups, wherein the rotor blade groups and the stator blade groups are disposed alternately along the rotor shaft, the turbo-molecular pump communicates with an exhaust pipe on a downstream side of the plurality of rotor blade groups in the exhaust stream, and has a gas supply port between the rotor blade group located furthest downstream in the exhaust stream and the exhaust pipe, and the gas supply port supplies a high-temperature gas.

According to the second aspect of the present invention, the gas supply port between the rotor blade group located furthest downstream in the exhaust stream and the exhaust pipe supplies a high-temperature gas. Since the supplied high-temperature gas makes contact with all the component parts facing into the space between the above-described rotor blade group and the exhaust pipe, all of these component parts are therefore heated. As a result, it is possible to suppress attachment of depositions onto all the component parts facing into the above-described space. Moreover, because the high-temperature gas makes contact with the surface of the component parts, only the surfaces of the component parts are heated. Hence, it is possible to suppress thermal expansion in the component parts, and thereby prevent damage to the component parts. Moreover, when depositions have attached to the surface of the component parts, the high-temperature gas makes contact with the attached depositions. Hence, it is possible to heat the depositions directly and remove the depositions by vaporization. According to the above, it is possible to reliably suppress attachment of depositions onto the component parts. Hence, the timing at which to replace the turbo-molecular pump can be set in simple manner, and the stable running of the turbo-molecular pump and, by extension, the substrate processing apparatus can be ensured.

Accordingly, in a third aspect of the present invention, there is provided a substrate processing apparatus comprising a processing chamber configured to perform processing on a substrate, and a turbo-molecular pump configured to discharge a deposition-causing gas from the processing chamber, wherein the turbo-molecular pump includes a rotor having a rotor shaft aligned with an exhaust stream, a cylindrical casing housing the rotor therein, a plurality of blade-form rotor blades projecting from the rotor orthogonally with respect to the rotor shaft, and a plurality of blade-form stator blades projecting orthogonally with respect to the rotor shaft from a rotor-facing surface in the cylindrical casing, the plurality of rotor blades are divided into a plurality of rotor blade groups, the plurality of stator blades are divided into a plurality of stator blade groups, and the rotor blade groups and the stator blade groups are disposed alternately along the rotor shaft, the turbo-molecular pump further includes a gas supply port located on an upstream side of the rotor blade group that is located furthest downstream in the exhaust stream, and the gas supply port supplies a deposition-suppressing gas which includes gas molecules having a large molecular weight.

Accordingly, in a fourth aspect of the present invention, there is provided a substrate processing apparatus comprising a processing chamber configured to perform processing on a substrate, and a turbo-molecular pump configured to discharge a deposition-causing gas from the processing chamber, wherein the turbo-molecular pump includes a rotor having a rotor shaft aligned with an exhaust stream, a cylindrical casing housing the rotor therein, a plurality of blade-form rotor blades projecting from the rotor orthogonally with respect to the rotor shaft, and a plurality of blade-form stator blades projecting orthogonally with respect to the rotor shaft from a rotor-facing surface in the cylindrical casing, the plurality of rotor blades are divided into a plurality of rotor blade groups, the plurality of stator blades are divided into a plurality of stator blade groups, and the rotor blade groups and the stator blade groups are disposed alternately along the rotor shaft, the turbo-molecular pump communicates with an exhaust pipe on a downstream side of the plurality of rotor blade groups in the exhaust stream, and has a gas supply port between the rotor blade group that is located furthest downstream in the exhaust stream and the exhaust pipe, and the gas supply port supplies a high-temperature gas.

Accordingly, in a fifth aspect of the present invention, there is provided a method for suppressing attachment of depositions to a turbo-molecular pump that is connected to a processing chamber via a valve for performing processing on a substrate, discharges deposition-causing gas from the processing chamber, and includes a rotor having a rotor shaft aligned with an exhaust stream, a cylindrical casing housing the rotor therein, a plurality of blade-form rotor blades projecting from the rotor orthogonally with respect to the rotor shaft, and a plurality of blade-form stator blades projecting orthogonally with respect to the rotor shaft from a rotor-facing surface in the cylindrical casing, the plurality of rotor blades being divided into a plurality of rotor blade groups, the plurality of stator blades being divided into a plurality of stator blade groups, and the rotor blade groups and the stator blade groups being disposed alternately along the rotor shaft, the method comprising a supplying step of closing the valve and supplying a deposition-suppressing gas that includes gas molecules having a large molecular weight from an upstream side of the rotor blade group that is located furthest downstream in the exhaust stream, and a processing step of opening the valve, and performing the processing on the substrate.

According to a fifth aspect of the present invention, before performing the processing on the substrate, the valve is closed and the deposition-suppressing gas including the gas molecules having the large molecular weight is supplied from upstream of the rotor blade group that is located furthest downstream in the exhaust stream. At this time, the gas molecules having the large molecular weight in the supplied deposition-suppressing gas make contact with the rotor blade and generate frictional heat, which acts to heat the deposition-suppressing gas. The heated deposition-suppressing gas makes contact with all the component parts facing into the space on the downstream side of the above-described rotor blade group, and thereby heats these component parts. As a result, it is possible to raise the temperature of the component parts by the time the processing is performed on the substrate. Thus, attachment of depositions onto the component parts can be reliably suppressed even when the deposition-causing gas flows in the turbo-molecular pump during processing on the substrate.

The fifth aspect of the present invention can provide a method for suppressing attachment of depositions to a turbo-molecular pump further comprising preceding the supplying step, a testing step of testing a state of attachment of depositions in the turbo-molecular pump, and a judging step of judging whether to execute the supplying step based on a result of the test.

According to the fifth aspect of the present invention, before supplying the deposition-suppressing gas, the state of attachment of depositions in the turbo-molecular pump is tested. A judgment on whether to supply the deposition-suppressing gas is then made based on the result of the test. It is thereby possible to prevent deposition-suppressing gas from being supplied wastefully, and to reduce the amount of deposition-suppressing gas flowing in a scrubber located downstream of the turbo-molecular pump. Consequently, the lifetime of the scrubber can be extended.

The fifth aspect of the present invention can provide a method for suppressing attachment of depositions to a turbo-molecular pump, wherein in the processing step, the deposition-suppressing gas is supplied from an upstream side of the rotor blade group that is located furthest downstream in the exhaust stream.

According to the fifth aspect of the present invention, deposition-suppressing gas is also supplied from the upstream side of the rotor blade group located furthest downstream in the exhaust stream when the processing is performed on the substrate. It is thereby possible to heat the component parts during periods, in which the deposition-causing gas is flowing, for the processing on the substrate, and to dilute the deposition-causing gas with the deposition-suppressing gas. As a result, attachment of depositions onto the component parts can be reliably suppressed.

Accordingly, in a sixth aspect of the present invention, there is provided a method for suppressing attachment of depositions to a turbo-molecular pump that is connected to a processing chamber via a valve for performing processing on a substrate, discharges deposition-causing gas from the processing chamber, and includes a rotor having a rotor shaft aligned with an exhaust stream, a cylindrical casing housing the rotor therein, a plurality of blade-form rotor blades projecting from the rotor orthogonally with respect to the rotor shaft, and a plurality of blade-form stator blades projecting orthogonally with respect to the rotor shaft from a rotor-facing surface in the cylindrical casing, the plurality of rotor blades being divided into a plurality of rotor blade groups, the plurality of stator blades being divided into a plurality of stator blade groups, the rotor blade groups and the stator blade groups being disposed alternately along the rotor shaft, and the turbo-molecular pump being communicated with an exhaust pipe on a downstream side of the plurality of rotor blade groups in the exhaust stream, the method comprising a supplying step of closing the valve and supplying a high-temperature gas from between the rotor blade group that is located furthest downstream in the exhaust stream and the exhaust pipe, and a processing step of opening the valve, and performing the processing on the substrate.

According to the sixth aspect of the present invention, before performing the processing on the substrate, the valve is closed and the high-temperature gas is supplied from between the rotor blade group that is located furthest downstream in the exhaust stream and the exhaust pipe. The supplied high-temperature gas makes contact with all the component parts facing into the space between the above-described rotor blade group and the exhaust pipe and heats these component parts. As a result, it is possible to raise the temperature of the component parts by the time the processing is performed on the substrate. Thus, attachment of depositions onto the component parts can be reliably suppressed even when the deposition-causing gas flows in the turbo-molecular pump during the processing on the substrate.

The features and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

First, the first embodiment of the present invention will be described.

Figure 1:
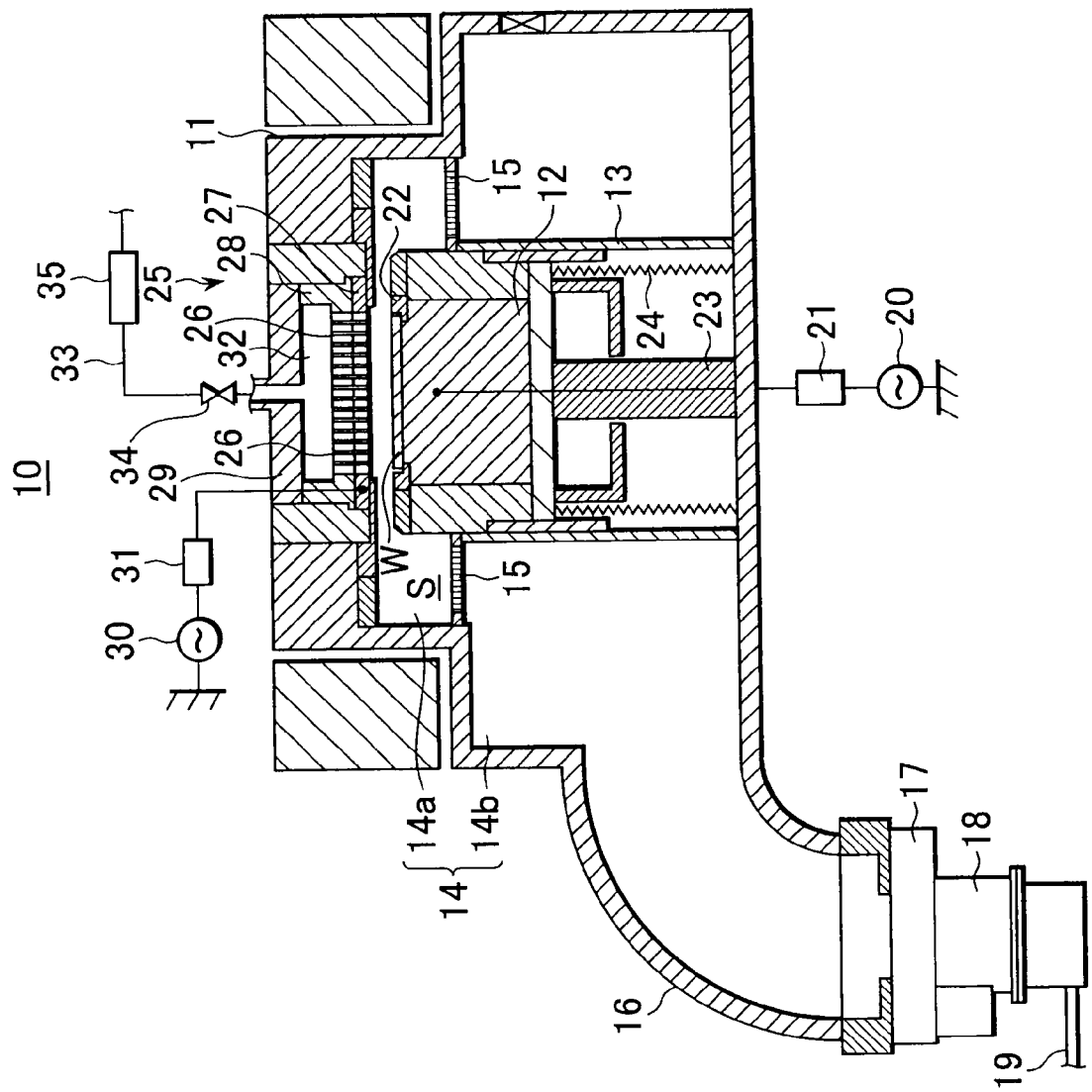
FIG. 1 is a cross-sectional view schematically showing a construction of a substrate processing apparatus including a turbo-molecular pump according to a first embodiment of the present invention.

FIG. 1 is a cross-sectional view schematically showing a construction of a substrate processing apparatus including a turbo-molecular pump according to the first embodiment of the present invention.

In FIG. 1, a substrate processing apparatus 10, which performs Reactive Ion Etching (hereinafter referred to as "RIE") on wafers W for semiconductor devices (hereinafter referred to simply as "wafers"), includes a chamber 11 (processing chamber) formed by combining two cylindrical bodies of different sizes made of a metal such as aluminum or stainless steel.

In the chamber 11, a lower electrode 12, which is a wafer stage capable of mounting a wafer W of a diameter of 300 mm or the like thereon and moving up and down in the chamber 11 together with the mounted wafer W, and a cylindrical cover 13 covering a side part of the lower electrode 12 are disposed. A side wall of the chamber 11 and the side part of the lower electrode 12 or the cover 13 form an exhaust path 14 which functions as a flow path for discharging gas from inside the chamber 11 to outside the chamber 11.

Partway along the exhaust path 14 is disposed an annular exhaust plate 15 which divides the exhaust path 14 into an upstream side portion 14a and a downstream side portion 14b. The downstream side portion 14b communicates with a turbo-molecular pump 18, which is an exhaust pump used for evacuation, via an exhaust manifold 16, which is a communicating pipe, and an Adaptive Pressure Control (hereinafter referred to as "APC") valve 17, which is a modifiable slide valve. A dry pump and a scrubber (neither of which is shown) are connected to the downstream side of the turbo-molecular pump 18 via an exhaust pipe 19. Note that the APC valve 17 may also be a butterfly valve.

A lower radio-frequency power source 20 is connected to the lower electrode 12 via a lower matcher 21 and supplies radio-frequency power to the lower electrode 12. The lower matcher 21 reduces reflection of the radio-frequency power from the lower electrode 12 to maximize the efficiency of the supply of the radio-frequency power to the lower electrode 12.

A focus ring 22 is provided in upper portion of the lower electrode 12 so as to surround the mounted wafer W. The focus ring 22 causes plasma generated in a processing space S, which is a space above the lower electrode 12, to converge on the wafer W.

A supporting member 23 is provided below the lower electrode 12, extending downwards from the lower portion thereof. The supporting member 23 supports the lower electrode 12 and causes the lower electrode 12 to move up and down. The supporting member 23 is surrounded and covered by a bellows cover 24, and is thereby screened off from the atmosphere in the chamber 11.

A shower head 25 which supplies processing gas to the processing space S is disposed in a ceiling portion of the chamber 11. The shower head 25 includes a circular plate-form upper electrode plate 27 facing the processing space S and having a large number of gas holes 26 formed therein, a cylindrical cooling plate 28 which detachably supports the upper electrode plate 27, and a circular plate-form cover 29 mounted on the cooling plate 28.

The upper electrode plate 27 is connected to an upper radio-frequency power source 30 via an upper matcher 31, and the upper radio-frequency power source 30 supplies radio-frequency electrical power to the upper electrode plate 27.

A buffer chamber 32 is provided inside the cooling plate 28, and a processing gas introducing pipe 33 is connected to the buffer chamber 32. A valve 34 is disposed partway along the processing gas introducing pipe 33, and a filter 35 is disposed upstream of the valve 34. A single gas or combination of gases from among, for instance, silicon tetrafluoride ($SiF_4$), oxygen gas ($O_2$), argon gas (Ar) and carbon tetrafluoride ($CF_4$) is introduced to the buffer chamber 32 from the processing gas introducing pipe 33, and the introduced processing gas is supplied to the processing space S via the gas holes 26.

In the substrate processing apparatus 10, the processing gas is supplied to the processing space S, and the radio-frequency electrical powers are provided to the processing space S by the lower electrode 12 and the upper electrode plate 27. At this point, a high-density plasma is generated from the processing gas. With the plasma caused to converge on surfaces of the wafer W by the focus ring 22, RIE processing is performed on the wafer W.

During the RIE processing, the plasma reacts with an etching film on the wafer W, but a certain amount of unreacted processing gas is left over. Also, reaction products may be generated by the reaction between the plasma and the etching film. At room temperature, the reaction products would attach as depositions to the component parts inside the chamber 11. However, because the plasma is at a high temperature, the reaction products vaporize so as to mix with the unreacted processing gas in vapor form. The unreacted processing gas alone or the mix of the unreacted processing gas and the vaporized reaction product (hereinafter both referred to as "deposition-causing gas") is discharged by turbo-molecular pump 18 via the exhaust path 14, the exhaust manifold 16 and the APC valve 17.

Figure 2:
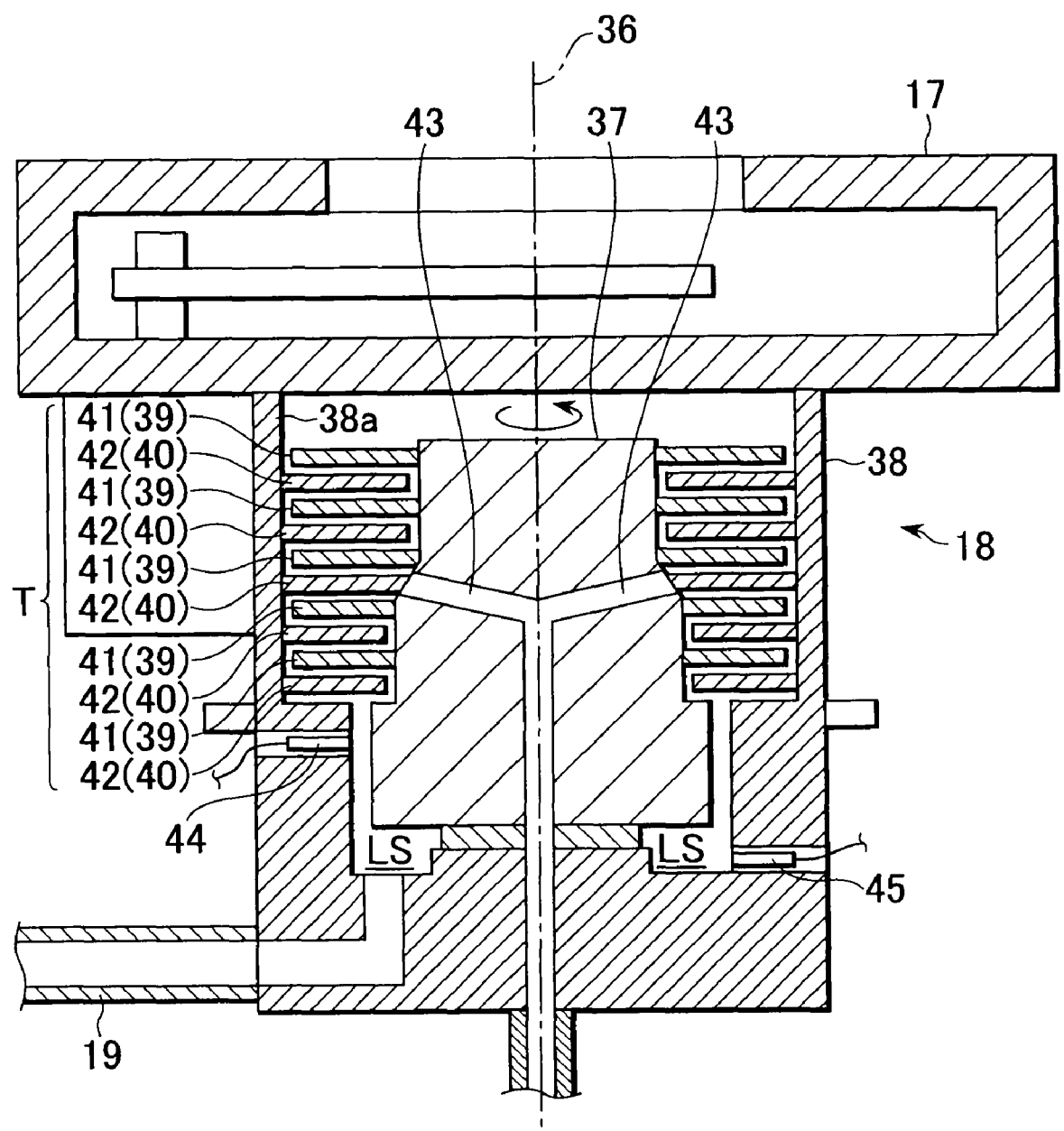
FIG. 2 is a cross-sectional view schematically showing a construction of the turbo-molecular pump in FIG. 1.

FIG. 2 is a cross-sectional view schematically showing a construction of the turbo-molecular pump in FIG. 1.

In FIG. 2, the turbo-molecular pump 18 includes a rotor 37 having a rotor shaft 36 which is aligned in an exhaust stream direction (vertical direction in the drawing), a cylindrical case 38 which houses the rotor 37 therein, a plurality of blade-form rotor blades 39 projecting orthogonally with respect to the rotor shaft 36 from the rotor 37, and a plurality of blade-form stator blades 40 projecting orthogonally with respect to the rotor shaft 36 from an rotor-facing surface 38a in the case 38.

The plurality of rotor blades 39 are divided into a plurality of rotor blade groups 41, and the plurality of stator blades 40 are divided into a plurality of stator blade groups 42. In each rotor blade group 41, the plurality of rotor blades 39 project radially from the rotor 37 and are coplanar in a plane orthogonal to the rotor shaft 36. The rotor blades 39 are provided at regular intervals around the rotor 37. In each stator blade group 42, a plurality of stator blades 40 are coplanar in a plane orthogonal to the rotor shaft 36 and project from the rotor-facing surface 38a of the case 38 towards the rotor shaft 36. The stator blades 40 are provided at regular intervals around the rotor 37. The rotor blade groups 41 and the stator blade groups 42 are disposed alternately along the rotor shaft 36. In the turbo-molecular pump 18, the rotor blade groups 41 and the stator blade groups 42 form a turbine T.

The turbo-molecular pump 18 includes an induction motor (not shown) therein, and the induction motor causes the rotor 37 to rotate at high speed (10000 rpm or more) around the rotor shaft 36. At this point, a pressure difference is generated between upper portions above the turbine T and lower portions below the turbine T in the drawing, and the pressure difference drives gas from the upper portions to the lower portions in the drawing at high speed. As a result, the exhaust stream flows from the upper portions to the lower portions in the drawing. Hereinafter, the upper portions in the drawing are referred to as an "upstream side" and the lower portions in the drawing are referred to a "downstream side".

On the downstream side of the turbine T, there exists a lower space LS (a space downstream side of the rotor blade groups) into which the gas is driven. The lower space LS communicates with the exhaust pipe 19. The gas driven into the lower space LS by the turbine T flows to the dry pump and further the scrubber via the exhaust pipe 19.

When the rotor 37 rotates at high speed in the manner described above, the pressure in the lower space LS rises. Consequently, there is risk that the reaction product in the deposition-causing gas and components of the processing gas will liquefy, solidify and attach as depositions to the component parts of the turbo-molecular pump 18 which face the lower space LS.

As a way of dealing with this, the turbo-molecular pump 18 of the present embodiment has a construction in which all the component parts which face the lower space LS are heated. This is to say that the turbo-molecular pump 18 has a plurality of gas supply ports 43 on an upstream side of the rotor blade group 41 located furthest downstream side in the exhaust stream. Specifically, the gas supply ports 43 are provided between the second rotor blade group 41 and the third rotor blade group 41 from the downstream side. The gas supply ports 43 supply the deposition-suppressing gas which includes gas molecules such as argon (Ar) molecules which have a large molecular weight. Note that the gas supply ports 43 are disposed at regular intervals along a circumference at which a plane orthogonal to the rotor shaft 36 intersects with a surface of the rotor 37.

Figure 3:
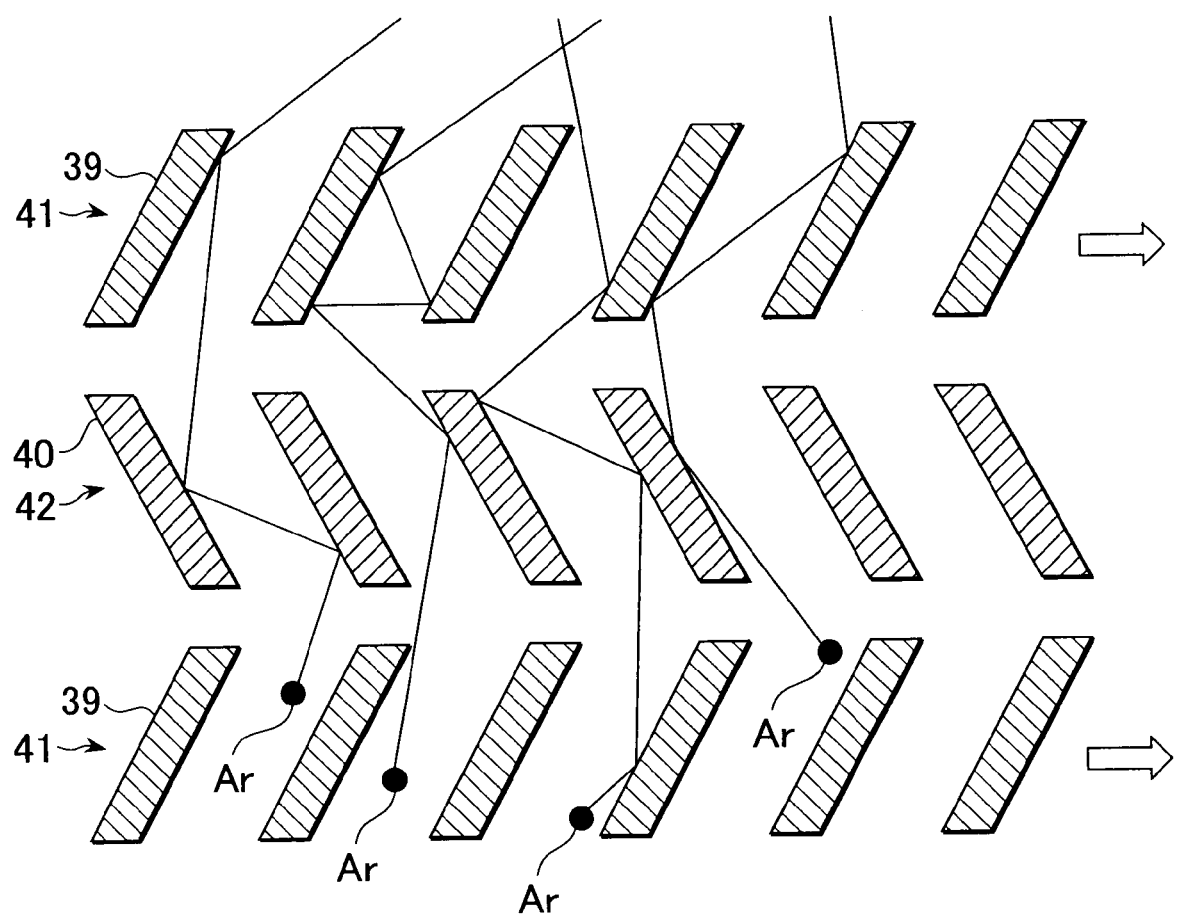
FIG. 3 is a view for describing contact between argon molecules in a deposition-suppressing gas and rotor or stator blades.

Argon molecules in the deposition-suppressing gas supplied from the gas supply ports 43 follow the exhaust stream, and repeatedly make contact with the rotor blades 39 which are rotating at high speed in the direction shown by the outline arrows in FIG. 3 or the stator blades 40 remaining stationary. When contact is made with the rotor blades 39 or the like which are rotating at high speed, the argon molecules particularly generate frictional heat by the friction with the rotor blade 39 or the like. The frictional heat acts to heat the deposition-suppressing gas. The heated deposition-suppressing gas is driven without cooling in the lower space LS, and heats all the component parts facing the lower space LS.

Figure 4:
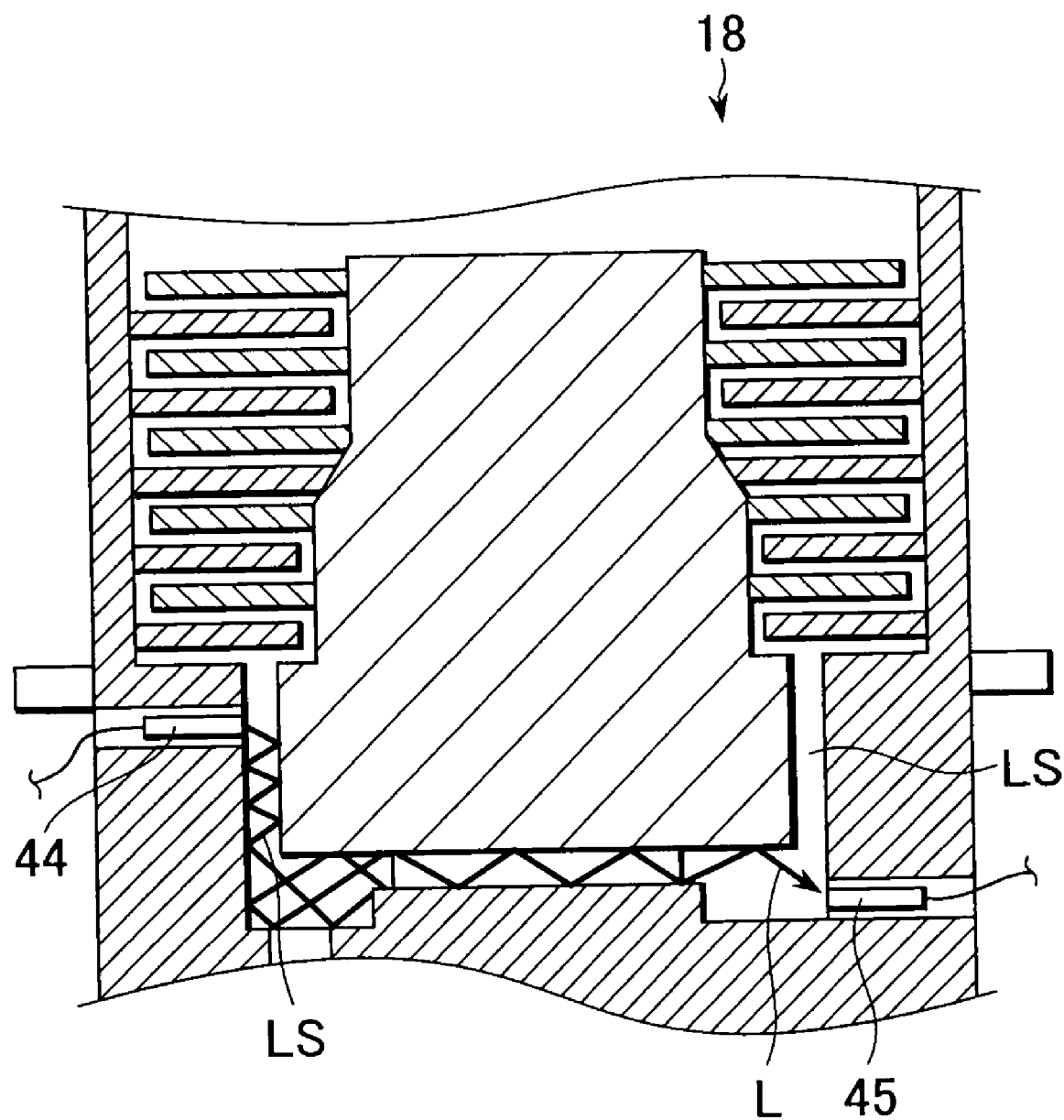
FIG. 4 is a view showing laser light being reflected on surfaces opposite to a lower space in the turbo-molecular pump of FIG. 2.

Returning to FIG. 2, it can be seen that the turbo-molecular pump 18 further includes a laser oscillator 44 which emits laser light L towards the lower space LS and a detector 45 which receives the emitted laser light L. The laser light L emitted from the laser oscillator 44 is repeatedly reflected by the surfaces of the component parts facing the lower space LS before being received by the detector 45 as shown in FIG. 4. Thus, when depositions has attached to the surfaces of the component parts facing the lower space LS, the depositions absorb energy from the laser light L, and a power of the laser light decreases. Hence, by measuring the power of the laser light L detected by the detector 45, it is possible to test a state of attachment of depositions.

Here, to improve the reflection efficiency of the laser light L, it is preferable that the surfaces of the component parts are coated with a material having a high reflectance. Examples of materials having a high reflectance include magnesium carbonate, silver, barium oxide, aluminum oxide, enamel, and porcelain enamel. To improve reflectance, the surfaces of the component parts may constructed from electrolytically polished aluminum, a white coating, or white paper (Japanese paper, absorbent paper, Kent paper, or Japanese eggshell colored paper).

When the laser oscillator 44 emits laser light L at high power, the APC valve 17 is closed and oxygen gas is supplied to the lower space LS while shutting off the exhaust stream from the upstream side of the turbine T. At this point, the oxygen gas is converted to ozone gas, and the ozone gas can break down and remove the depositions attaching to the surfaces of the component parts by deoxidization.

According to the turbo-molecular pump 18 of the present embodiment, the gas supply ports 43 located on the upstream side of the rotor blade group 41 that is located furthest downstream in the exhaust flow supply the deposition-suppressing gas including the argon molecules. The argon molecules in the supplied deposition-suppressing gas join with the exhaust flow and make contact with the rotor blades 39. Because the rotor blades 39 are rotating at high speed, frictional heat is generated when the rotor blades 39 make contact with the argon molecules included in the deposition-suppressing gas, and the frictional heat acts to heat the deposition-suppressing gas. Since the heated deposition-suppressing gas makes contact with all the component parts facing into the lower space LS, these component parts are all heated. As a result, it is possible to suppress attachment of the depositions onto all the component parts facing into the lower space LS.

Also, since the heated deposition-suppressing gas makes contact with the surfaces of the component parts, only the surfaces of the component parts are heated. Hence, it is possible to suppress thermal expansion in the component parts, and thereby prevent damage to the component parts.

Moreover, when depositions have attached to the surface of the component parts, the heated deposition-suppressing gas makes contact with the attached depositions. Hence, it is possible to heat the depositions directly and remove the depositions by vaporization.

According to the above, it is possible to reliably suppress attachment of depositions onto the component parts. Hence, a timing at which to replace the turbo-molecular pump 18 can be set in simple manner, and the stable running of the turbo-molecular pump 18 and, by extension, the substrate processing apparatus 10 can be ensured.

In the turbo-molecular pump 18, the deposition-suppressing gas is supplied partway along the turbine T. Hence, there is no backflow of the deposition-suppressing gas into the chamber 11 and the RIE processing is unaffected. Also, although the rotor blades 39 are heated by the frictional heat generated by the contact with the argon molecules, supplying the deposition-suppressing gas from partway along the turbine T means that not all of the rotor blades 39 in the turbo-molecular pump 18 are heated. It is therefore possible to avoid the risk of damage to the turbine T seen when all the rotor blades 39 are damaged by thermal expansion.

In the above described turbo-molecular pump 18, the gas molecules having the large molecular weight in the deposition-suppressing gas are argon molecules. However the included gas molecules may be any molecules with a molecular weight that equals or exceeds the atomic weight of argon. By using molecules with a molecular weight that exceeds the atomic weight of argon, it is possible to increase the frictional heat generated by the contact between the rotor blades 39 and the gas molecules, and thereby reliably heat the deposition-suppressing gas. The gas molecules used in this role include krypton molecules, xenon molecules and the like.

In the above-described turbo-molecular pump 18, the deposition-suppressing gas may be heated to a high temperature before being supplied. This reliably raises the temperature of the deposition-suppressing gas above the temperature resulting from heating only by the frictional heat generated by contacts between the rotor blades 39 and the argon molecules. As a result, it is possible to reliably raise the temperature of the surfaces of the component parts which make contact with the deposition-suppressing gas.

Moreover, the gas supply ports 43 may supply a cleaning gas in addition to the deposition-suppressing gas. When depositions have attached to the surface of the component parts, this arrangement is able to reliably remove the depositions using the cleaning function of the cleaning gas. Here, the cleaning gas may be ozone, ammonia, chlorine trifluoride or the like.

In the turbo-molecular pump 18, a high-temperature gas may also be supplied from an upstream side of the turbine T. This arrangement makes it possible not only to reliably raise the temperature of the surfaces of the component parts, but also to dilute the deposition-causing gas, and therefore reliably suppress attachment of depositions onto the component parts.

In the above-described turbo-molecular pump 18, a gas including argon molecules was supplied as the deposition-suppressing gas from the gas supply ports 43, but a high-temperature gas composed of nitrogen and not including argon molecules may be supplied from the gas supply ports 43 in place of the gas including argon molecules. In such an arrangement, the supplied high-temperature gas makes contact with all the component parts facing into the lower space LS, and it is therefore possible to suppress attachment of depositions to all the component parts facing into the lower space LS.

In the above-described turbo-molecular pump 18, the gas supply ports 43 were provided in the rotor 37. However, the gas supply ports 43 may be provided as openings in the rotor-facing surface 38a of the case 38.

Next, a method for suppressing attachment of depositions to the turbo-molecular pump according to the first embodiment of the present invention will be described.

Figure 5:
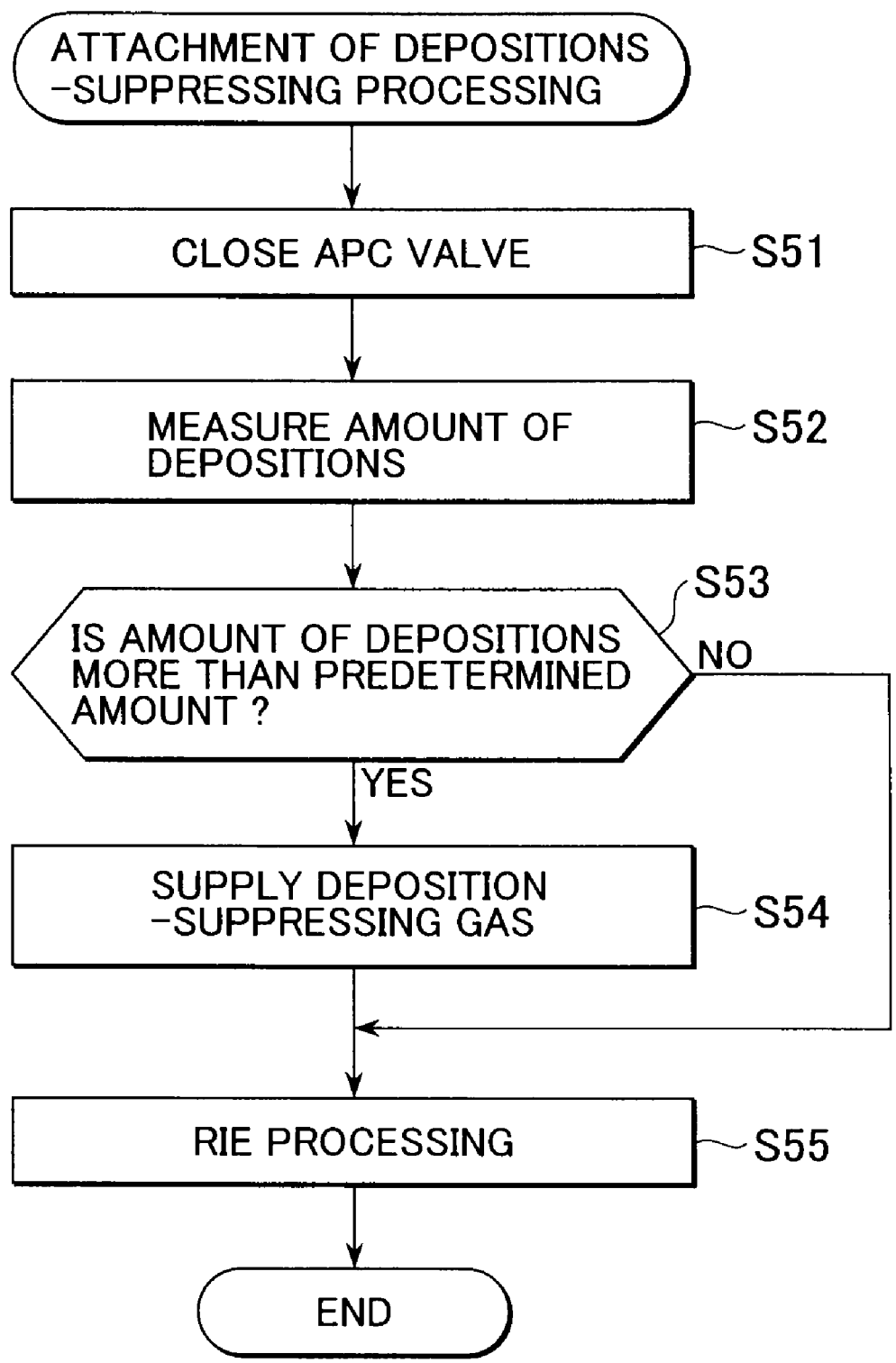
FIG. 5 is a flowchart of attachment of depositions-suppressing processing as the method for suppressing attachment of depositions to the turbo-molecular pump according to the present embodiment.

FIG. 5 is a flowchart of attachment of depositions-suppressing processing as the method for suppressing attachment of depositions to the turbo-molecular pump according to the present embodiment.

As shown in FIG. 5, first, in order to transfer the wafer W in or out of the chamber 11, the APC valve 17 is closed to shut off communication between the chamber 11 and the turbo-molecular pump 18 (step S51), and the amount of depositions attaching to the surfaces of the component parts facing into the lower space LS is measured (state of attachment of the depositions is tested) by emitting laser light L into the lower space LS from the laser oscillator 44 (step S52) (testing step).

Next, in step S53, it is judged whether the measured amount of depositions is more than a predetermined amount (judging step). When the measured amount of depositions is less than or equal to the predetermined amount, the processing proceeds directly to step S55. When the measured amount of depositions is more than the predetermined amount, the deposition-suppressing gas is supplied from the gas supply ports 43 of the rotor 37 in the turbo-molecular pump 18 (steps S54) (supplying step).

Next, the APC valve 17 is opened, and RIE processing is performed on the wafer W in the chamber 11 (step S55) (processing step), and the processing is terminated.

According to the processing of FIG. 5, the APC valve 17 is closed and the deposition-suppressing gas is supplied from the gas supply ports 43 of the rotor 37 in the turbo-molecular pump 18 before performing the RIE processing on the wafer W. At this point, frictional heat is generated by the rotor blades 39 making contact with the argon molecules included in the supplied deposition-suppressing gas, and the deposition-suppressing gas is heated by the frictional heat. The heated deposition-suppressing gas makes contact with all the component parts facing into the lower space LS, and heats these component parts. As a result, it is possible to raise the temperature of the component parts by the time the RIE processing is performed on the wafer W. Thus, attachment of depositions onto the component parts can be reliably suppressed even when the deposition-causing gas flows in the turbo-molecular pump 18 during the RIE processing on the wafer W.

In the processing of FIG. 5, a measurement of amount of depositions attached to the surfaces of the component parts facing the lower space LS is made before supplying the deposition-suppressing gas. It is then judged whether to supply the deposition-suppressing gas based on the result of the measurement. It is thereby possible to prevent deposition-suppressing gas from being supplied wastefully, and to reduce the amount of deposition-suppressing gas flowing in a filter of the scrubber located downstream of the turbo-molecular pump 18 via the exhaust pipe 19. Consequently, the lifetime of the scrubber can be extended.

In the above-described processing of FIG. 5, the deposition-suppressing gas is not supplied from the gas supply ports 43 when performing the RIE processing on the wafer W. However, deposition-suppressing gas may be supplied from the gas supply ports 43 when performing the RIE processing on the wafer W. With such an arrangement, it is possible to heat the component parts during periods in which the deposition-causing gas is flowing in the turbo-molecular pump 18 and dilute the deposition-causing gas with the deposition-suppressing gas. As a result, attachment of depositions onto the component parts can be suppressed with higher reliability.

Next, a second embodiment of the present invention will be described.

In terms of construction and function, the present embodiment is basically the same as the above described first embodiment. The present embodiment differs only in the opening location of the gas supply ports in the rotor 37 and in the type of gas supplied from the gas supply port. Hence, the following describes the differing construction and functions, and omits any description of construction and functions which are duplicated.

Figure 6:
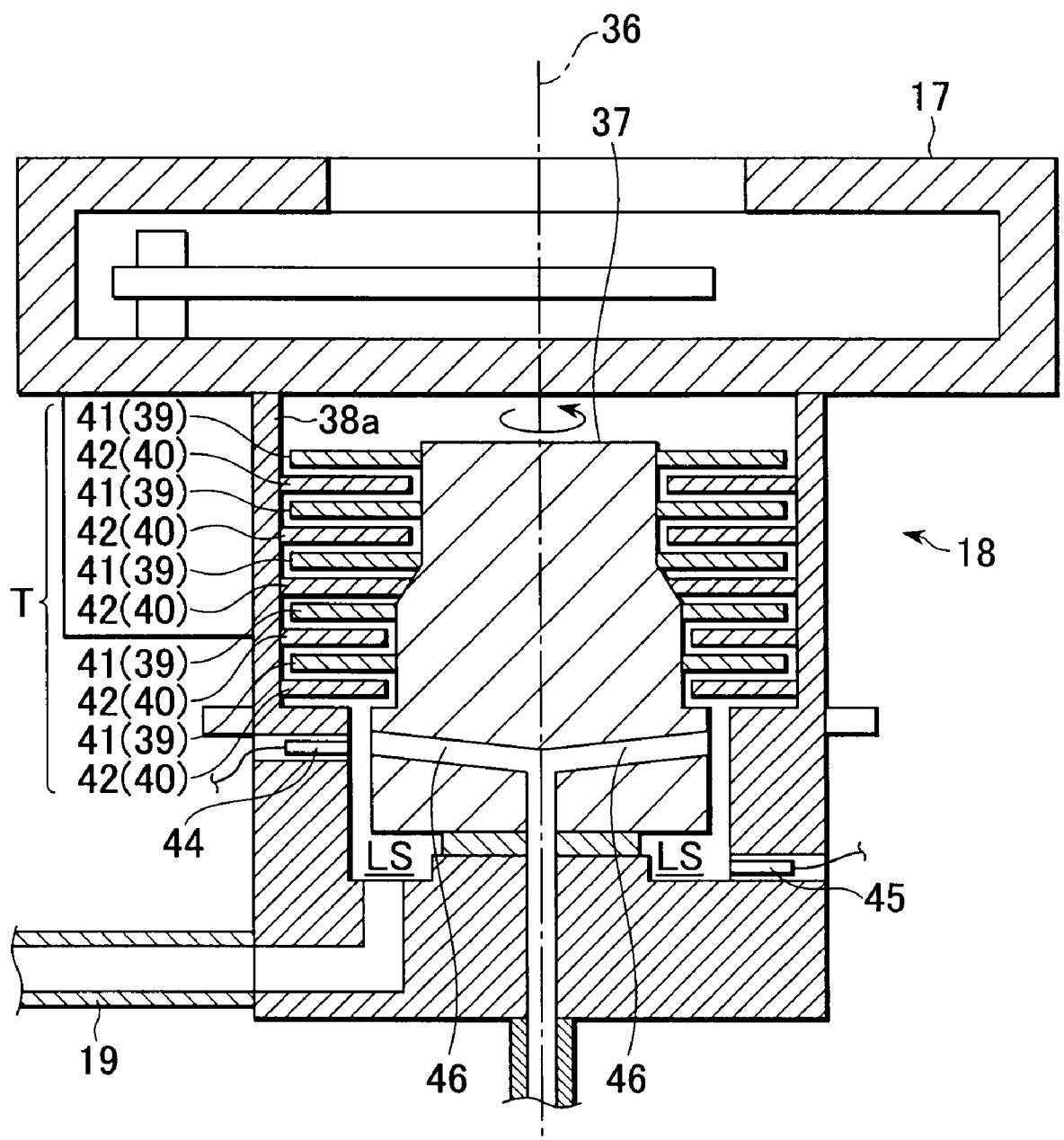
FIG. 6 is a cross-sectional view schematically showing a construction of a turbo-molecular pump according to a second embodiment of the present invention.

FIG. 6 is a cross-sectional view schematically showing a construction of the turbo-molecular pump according to the present embodiment.

The turbo-molecular pump 18 shown in FIG. 6 has a plurality of openings between the rotor blade group 41 located furthest downstream in the exhaust stream, and the exhaust pipe 19 in the rotor 37. Specifically, the openings are a plurality of gas supply ports 46 which face the lower space LS. The gas supply ports 46 supply a high-temperature gas composed of high-temperature nitrogen gas. Note that the gas supply ports 46 are disposed, in a similar manner to the gas supply ports 43, at regular intervals on a circumference at which a plane orthogonal to the rotor shaft 36 intersects with a surface of the rotor 37.

According to the turbo-molecular pump 18 of the present embodiment, gas supply ports 46 facing towards the lower space LS supply the high-temperature gas. Since the supplied high-temperature gas makes contact with all the component parts facing into the lower space LS, these component parts are all heated. As a result, it is possible to suppress attachment of depositions to all the component parts facing into the lower space LS.

Moreover, because the high-temperature gas makes contact with the surfaces of the component parts, only the surfaces of the component parts are heated. Hence, it is possible to suppress thermal expansion in the component parts, and thereby prevent damage to the component parts.

Moreover, when depositions have attached to the surface of the component parts, the high-temperature gas makes contact with the attached depositions. Hence, it is possible to heat the depositions directly and remove the depositions by vaporization.

According to the above, it is possible to reliably suppress attachment of depositions to the component parts.

In the above-described turbo-molecular pump 18, the high-temperature gas is made up of high-temperature nitrogen gas. However, the high-temperature gas may be made up of a high-temperature inert gas such as neon gas or helium gas.

Next, a method for suppressing attachment of depositions to the turbo-molecular pump according to the second embodiment of the present invention will be described.

Figure 7:
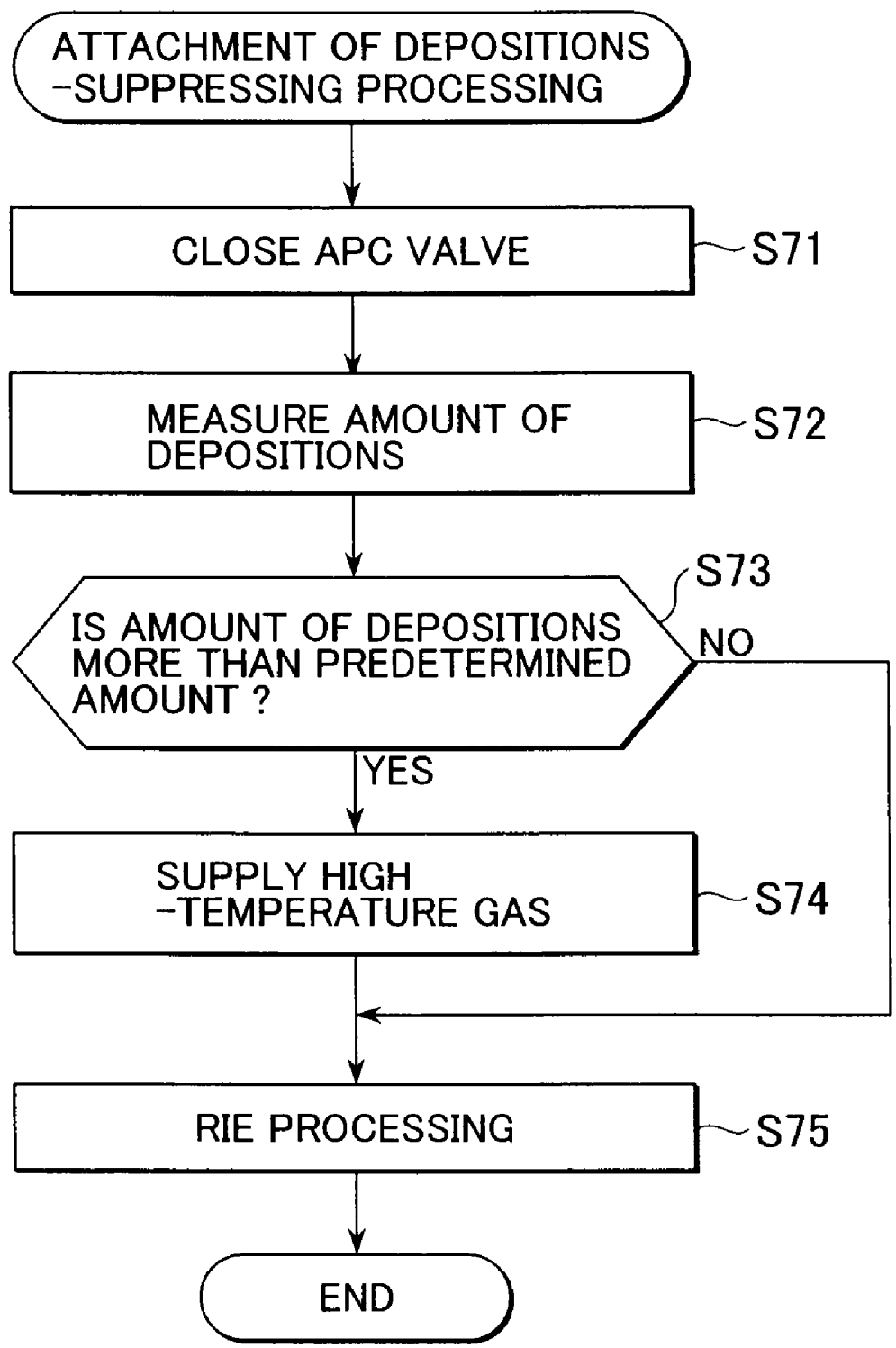
FIG. 7 is a flowchart of attachment of depositions-suppressing processing as the method for suppressing attachment of depositions to the turbo-molecular pump according to the present embodiment.
Figure 8:
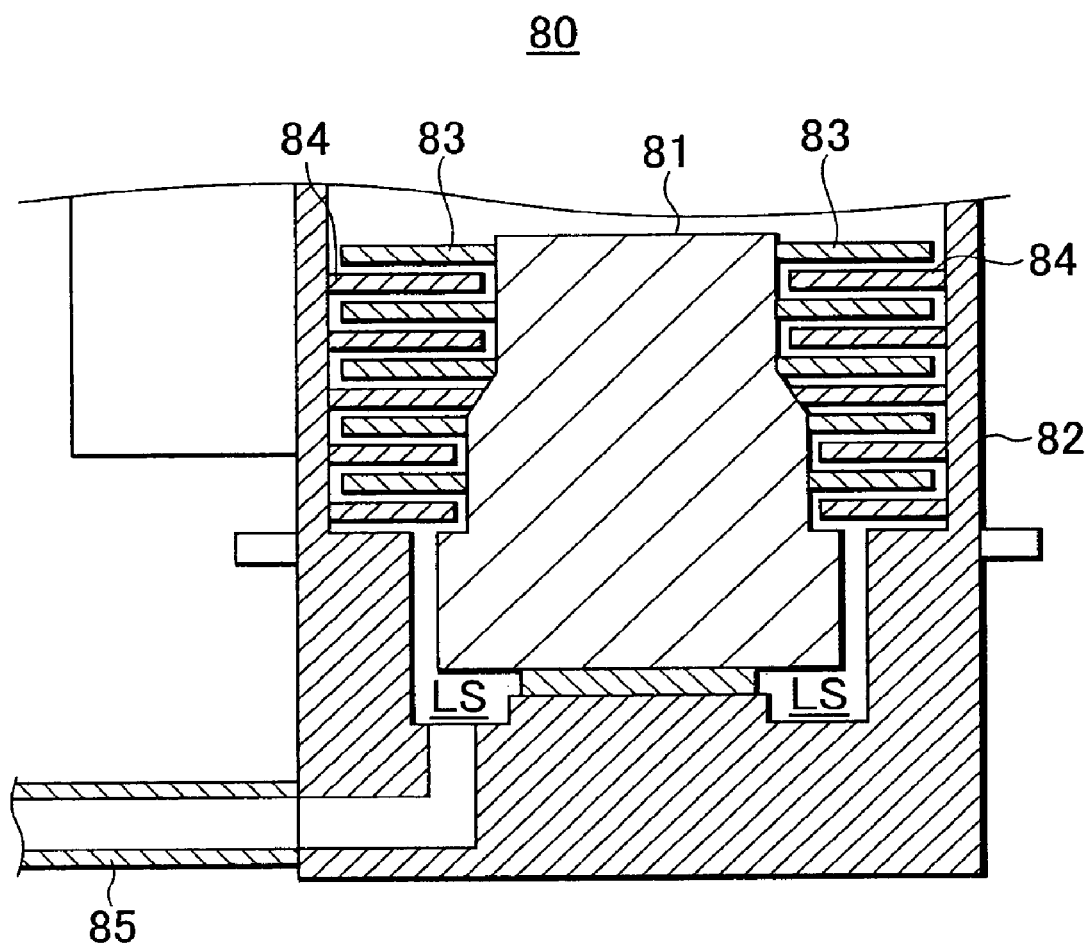
FIG. 8 is cross-sectional view schematically showing a construction of a conventional turbo-molecular pump.

FIG. 7 is a flowchart of attachment of depositions-suppressing processing as the method for suppressing attachment of depositions to the turbo-molecular pump according to the present embodiment.

As shown in FIG. 7, the APC valve 17 is first closed to shut off communication between the chamber 11 and the turbo-molecular pump 18 (step S71) in order to transfer the wafer W in or out of the chamber 11, and the amount of depositions attaching to the surfaces of the component parts facing into the lower space LS is measured by emitting laser light L into the lower space LS from the laser oscillator 44 (step S72).

Next, in step S73, it is judged whether the measured amount of depositions is more than a predetermined amount. When it is judged that the measured amount of depositions is less than or equal to the predetermined amount, the processing proceeds directly to step S75. When the measured amount of depositions is more than the predetermined amount, high-temperature gas is supplied from the gas supply ports 46 in the rotor 37 of the turbo-molecular pump 18 (step S74) (supplying step).

Next, the APC valve 17 is opened, RIE processing is performed on the wafer W in the chamber 11 (step S75) (processing step), and the processing is terminated.

According to the processing of FIG. 7, the APC valve 17 is closed and the high temperature gas is supplied from the gas supply ports 46 towards the lower space LS before performing the RIE processing on the wafer W. The supplied high-temperature gas makes contact with all the component parts facing into the lower space LS, thereby heating these component parts. As a result, it is possible to raise the temperature of the component parts by the time the RIE processing is performed on the wafer W. Thus, attachment of depositions onto the component parts can be reliably suppressed even when the deposition-causing gas flows in the turbo-molecular pump 18 during the RIE processing on the wafer W.

In the above-described processing of FIG. 7, the high-temperature gas is not supplied from the gas supply ports 46 when performing the RIE processing on the wafer W. However, the high-temperature gas may be supplied from the gas supply ports 46 when performing the RIE processing on the wafer W. It is thereby possible to heat the component parts during periods in which the deposition-causing gas is flowing in the turbo-molecular pump 18 and dilute the deposition-causing gas with the high temperature gas. As a result, attachment of depositions onto the component parts can be suppressed with higher reliability.

Note that the above-described first embodiment and second embodiment may be combined. Specifically, the rotor 37 may have the gas supply ports 43 and 46.

What is claimed is:

1. A turbo-molecular pump configured to discharge a deposition-causing gas from a processing chamber for performing processing on a substrate, said turbo-molecular pump comprising:
   a rotor having a rotor shaft aligned with an exhaust stream;
   a cylindrical casing housing said rotor therein;
   a plurality of blade-form rotor blades projecting from said rotor orthogonally with respect to the rotor shaft, said plurality of rotor blades being divided into a plurality of rotor blade groups;
   a plurality of blade-form stator blades projecting orthogonally with respect to the rotor shaft from a rotor-facing surface in said cylindrical casing, said plurality of stator blades being divided into a plurality of stator blade groups; and
   a gas supply port included in said rotor, the gas supply port being located on an upstream side of the rotor blade group that is located furthest downstream in the exhaust stream,
   wherein the rotor blade groups and the stator blade groups are disposed alternately along the rotor shaft, and
   wherein said gas supply port supplies a deposition-suppressing gas which includes gas molecules having a molecular weight not less than an atomic weight of argon.

2. The turbo-molecular pump as claimed in claim 1, wherein the deposition-suppressing gas has been heated to high-temperature.

3. The turbo-molecular pump as claimed in claim 1, wherein said gas supply port supplies a cleaning gas in addition to the deposition-suppressing gas.

4. The turbo-molecular pump as claimed in claim 3, wherein the cleaning gas includes at least one of a group made up of ozone, ammonia, and chlorine trifluoride.

5. The turbo-molecular pump as claimed in claim 1, further comprising:
   a laser oscillator emitting a laser light towards a lower space arranged on a downstream side of the rotor blade group that is located furthest downstream in the exhaust stream in the cylindrical casing; and
   a detector receiving the laser light which is repeatedly reflected by surfaces of component parts facing the lower space, wherein
   power of the received laser light is measured so as to test a state of attachment of depositions.

6. The turbo-molecular pump as claimed in claim 5, wherein the surfaces of the component parts, by which the laser light is repeatedly reflected, are coated with a material having a high reflectance.

7. A turbo-molecular pump configured to discharge a deposition-causing gas from a processing chamber for performing processing on a substrate, said turbo-molecular pump comprising:
   a rotor having a rotor shaft aligned with an exhaust stream;
   a cylindrical casing housing said rotor therein;
   a plurality of blade-form rotor blades projecting from said rotor orthogonally with respect to the rotor shaft, said plurality of rotor blades being divided into a plurality of rotor blade groups; and
   a plurality of blade-form stator blades projecting orthogonally with respect to the rotor shaft from a rotor-facing surface in said cylindrical casing, said plurality of stator blades being divided into a plurality of stator blade groups,
   wherein the rotor blade groups and the stator blade groups are disposed alternately along the rotor shaft,
   wherein said turbo-molecular pump communicates with an exhaust pipe on a downstream side of the plurality of rotor blade groups in the exhaust stream, and has
   wherein said rotor includes a gas supply port between the rotor blade group located furthest downstream in the exhaust stream and the exhaust pipe, and
   wherein said gas supply port supplies a high-temperature gas.

8. The turbo-molecular pump as claimed in claim 7, further comprising:
   a laser oscillator emitting a laser light towards a lower space arranged on a downstream side of the rotor blade group that is located furthest downstream in the exhaust stream in the cylindrical casing; and
   a detector receiving the laser light which is repeatedly reflected by surfaces of component parts facing the lower space,
   wherein power of the received laser light is measured so as to test a state of attachment of depositions.

9. The turbo-molecular pump as claimed in claim 8, wherein the surfaces of the component parts, by which the laser light is repeatedly reflected, are coated with a material having a high reflectance.

10. A substrate processing apparatus comprising:
    a processing chamber configured to perform processing on a substrate; and
    a turbo-molecular pump configured to discharge a deposition-causing gas from said processing chamber, said turbo-molecular pump including
    a rotor having a rotor shaft aligned with an exhaust stream,
    a cylindrical casing housing the rotor therein,
    a plurality of blade-form rotor blades projecting from the rotor orthogonally with respect to the rotor shaft, and
    a plurality of blade-form stator blades projecting orthogonally with respect to the rotor shaft from a rotor-facing surface in the cylindrical casing,
    wherein the plurality of rotor blades are divided into a plurality of rotor blade groups, the plurality of stator blades are divided into a plurality of stator blade groups, and the rotor blade groups and the stator blade groups are disposed alternately along the rotor shaft,
    wherein the rotor of said turbo-molecular pump further includes a gas supply port located on an upstream side of the rotor blade group that is located furthest downstream in the exhaust stream, and
    wherein said gas supply port supplies a deposition-suppressing gas which includes gas molecules having a molecular weight not less than an atomic weight of argon.

11. A substrate processing apparatus comprising:
    a processing chamber configured to perform processing on a substrate; and
    a turbo-molecular pump configured to discharge a deposition-causing gas from the processing chamber, said turbo-molecular pump including
    a rotor having a rotor shaft aligned with an exhaust stream,
    a cylindrical casing housing the rotor therein,
    a plurality of blade-form rotor blades projecting from the rotor orthogonally with respect to the rotor shaft,
    a plurality of blade-form stator blades projecting orthogonally with respect to the rotor shaft from a rotor-facing surface in the cylindrical casing, and
    gas supply ports supplying a deposition-suppressing gas between the rotor blades and the stator blades,
    wherein said gas supply ports are located on an upstream side of the rotor blade located furthest downstream in the exhaust stream and disposed on the rotor at regular intervals along a circumference at which a plane orthogonal to the rotor shaft intersects with a surface of the rotor.

12. A method for suppressing attachment of depositions to a turbo-molecular pump that is connected to a processing chamber via a valve for performing processing on a substrate, the turbo-molecular pump discharging deposition-causing gas from the processing chamber and including a rotor having a rotor shaft aligned with an exhaust stream, a cylindrical casing housing the rotor therein, a plurality of blade-form rotor blades projecting from the rotor orthogonally with respect to the rotor shaft, and a plurality of blade-form stator blades projecting orthogonally with respect to the rotor shaft from a rotor-facing surface in the cylindrical casing, the plurality of rotor blades being divided into a plurality of rotor blade groups, the plurality of stator blades being divided into a plurality of stator blade groups, the rotor blade groups and the stator blade groups being disposed alternately along the rotor shaft, and the rotor including a gas supply port located on an upstream side of the rotor blade group that is located further downstream in the exhaust stream, the method comprising:
    a supplying step of closing the valve, and supplying a deposition-suppressing gas that includes gas molecules having a molecular weight not less than an atomic weight of argon from the gas supply port; and a processing step of opening the valve, and performing the processing on the substrate.

13. The method for suppressing attachment of depositions to a turbo-molecular pump as claimed in claim 12, wherein said processing step includes another supplying step of supplying the deposition-suppressing gas from an upstream side of the rotor blade group that is located furthest downstream in the exhaust stream.

14. The method for suppressing attachment of depositions to a turbo-molecular pump as claimed in claim 12, further comprising:
preceding said supplying step, a testing step of testing a state of attachment of depositions in the turbo-molecular pump; and
a judging step of judging whether to execute the supplying step based on a result of the testing step,
wherein in said testing step, a laser light is emitted towards a lower space arranged on a downstream side of the rotor blade group that is located furthest downstream in the exhaust stream in the cylindrical casing, the emitted laser light is repeatedly reflected by surfaces of component parts facing the lower space, the reflected laser light is received, and then power of the received laser light is measured so as to test the state of attachment of the depositions.

15. A method for suppressing attachment of depositions to a turbo-molecular pump that is connected to a processing chamber via a valve for performing processing on a substrate, the turbo-molecular pump discharging deposition-causing gas from the processing chamber and including a rotor having a rotor shaft aligned with an exhaust stream, a cylindrical casing housing the rotor therein, a plurality of blade-form rotor blades projecting from the rotor orthogonally with respect to the rotor shaft, and a plurality of blade-form stator blades projecting orthogonally with respect to the rotor shaft from a rotor-facing surface in the cylindrical casing, the plurality of rotor blades being divided into a plurality of rotor blade groups, the plurality of stator blades being divided into a plurality of stator blade groups, the rotor blade groups and the stator blade groups being disposed alternately along the rotor shaft, the turbo-molecular pump being communicated with an exhaust pipe on a downstream side of the plurality of rotor blade groups in the exhaust stream, and the rotor including a gas supply port between the rotor blade group located furthest downstream in the exhaust stream and the exhaust pipe, the method comprising:
a supplying step of closing the valve, and supplying a high-temperature gas from the gas supply port; and
a processing step of opening the valve, and performing the processing on the substrate.

16. The method for suppressing attachment of depositions to a turbo-molecular pump as claimed in claim 15, further comprising:
preceding said supplying step, a testing step of testing a state of attachment of depositions in the turbo-molecular pump; and
a judging step of judging whether to execute the supplying step based on a result of the test, wherein
in said testing step, a laser light is emitted towards a lower space arranged on a downstream side of the rotor blade group that is located furthest downstream in the exhaust stream in the cylindrical casing, the emitted laser light is repeatedly reflected by surfaces of component parts facing the lower space, the reflected laser light is received, and then power of the received laser light is measured so as to test the state of attachment of the depositions.

17. A turbo-molecular pump configured to discharge a deposition-causing gas from a processing chamber for performing processing on a substrate, said turbo-molecular pump comprising:
a rotor having a rotor shaft aligned with an exhaust stream;
a cylindrical casing housing said rotor therein;
a plurality of blade-form rotor blades projecting from said rotor orthogonally with respect to the rotor shaft;
a plurality of blade-form stator blades projecting orthogonally with respect to the rotor shaft from a rotor-facing surface in said cylindrical casing; and
gas supply ports supplying a deposition-suppressing gas between the rotor blades and the stator blades,
wherein the gas supply ports are located on an upstream side of the rotor blade located furthest downstream in the exhaust stream and disposed on the rotor at regular intervals along a circumference at which a plane orthogonal to the rotor shaft intersects with a surface of the rotor.

18. The turbo-molecular pump as claimed in claim 17, further comprising:
a laser oscillator emitting a laser light towards a lower space arranged on a downstream side of the rotor blade located furthest downstream in the exhaust stream in the cylindrical casing; and
a detector receiving the laser light which is repeatedly reflected by surfaces of component parts facing the lower space, wherein
power of the received laser light is measured so as to test a state of attachment of depositions.

* * * * *